(12) United States Patent
Yamazaki (10) Patent No.: US 9,174,357 B2
(45) Date of Patent: Nov. 3, 2015

(54) EXTRUSION-FORMING DEVICE

(75) Inventor: Yasunori Yamazaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 685 days.

(21) Appl. No.: 12/708,565

(22) Filed: Feb. 19, 2010

(65) Prior Publication Data

US 2010/0244308 A1    Sep. 30, 2010

(30) Foreign Application Priority Data

Mar. 25, 2009  (JP) ................................. 2009-073958

(51) Int. Cl.
| | |
|---|---|
| B28B 3/22 | (2006.01) |
| B30B 11/24 | (2006.01) |
| B28B 3/20 | (2006.01) |
| B29C 47/00 | (2006.01) |
| B29C 47/12 | (2006.01) |
| B29C 47/38 | (2006.01) |
| B29C 47/40 | (2006.01) |
| B29L 31/60 | (2006.01) |

(52) U.S. Cl.
CPC . *B28B 3/22* (2013.01); *B28B 3/224* (2013.01); *B30B 11/243* (2013.01); *B30B 11/246* (2013.01); *B28B 2003/203* (2013.01); *B29C 47/0028* (2013.01); *B29C 47/12* (2013.01); *B29C 47/38* (2013.01); *B29C 47/402* (2013.01); *B29L 2031/60* (2013.01)

(58) Field of Classification Search
CPC .... B28B 2003/203; B28B 3/22; B28B 3/224; B30B 11/243; B30B 11/246; B29C 47/0028; B29C 47/12; B29C 47/38; B29C 47/402

USPC .......... 425/204, 208, 380, 461, 464, 467; 264/177.12

See application file for complete search history.

(56) References Cited

U.S. PATENT DOCUMENTS

| | | | | |
|---|---|---|---|---|
| 3,584,340 | A | * | 6/1971 | Koch ............................ 425/207 |
| 4,040,607 | A | * | 8/1977 | Ullrich ........................... 366/85 |
| 4,408,888 | A | * | 10/1983 | Hanslik ......................... 366/83 |
| 4,994,223 | A | | 2/1991 | Hestehave et al. |
| 2002/0015750 | A1 | | 2/2002 | Yamaguchi et al. |
| 2008/0102146 | A1 | * | 5/2008 | Yamazaki ..................... 425/113 |
| 2009/0166910 | A1 | | 7/2009 | Marshall et al. |
| 2010/0310693 | A1 | * | 12/2010 | Klee ............................. 425/113 |

FOREIGN PATENT DOCUMENTS

| | | |
|---|---|---|
| DE | 28 54 207 A1 | 6/1980 |
| JP | 09-104056 A1 | 4/1997 |
| JP | 2008-137184 A1 | 6/2008 |

OTHER PUBLICATIONS

Extended European Search Report dated May 9, 2012.

* cited by examiner

*Primary Examiner* — Yogendra Gupta
*Assistant Examiner* — Joseph Leyson
(74) *Attorney, Agent, or Firm* — Burr & Brown, PLLC (57) ABSTRACT

An extrusion-forming device includes an extruding portion having a drum including a supply port through which a clay flows into the inside, a screw having a rotary shaft and a rotary blade and configured to convey the clay, and an extrusion port through which the clay is discharged; and a forming portion having a die provided with forming grooves. The device includes, as the screw on the side of the supply port, supply port side screws having two rotary blades and, as the screw on the side of the extrusion port, a extrusion port side screw having one rotary blade, and a ratio P/D is in a range of 0.5 to 0.9.

11 Claims, 7 Drawing Sheets

FIG.9 EXAMPLE 1

FIG.10 EXAMPLE 1

EXTRUSION-FORMING DEVICE

BACKGROUND OF THE INVENTION

1. Field of the Invention

The present invention relates to an extrusion-forming device which is preferably used, for example, for manufacturing a formed article containing a ceramic material, and a method for manufacturing a formed article by use of the device.

2. Description of the Related Art

Heretofore, as an extrusion-forming device preferably used for manufacturing a formed article containing a ceramic material or the like, for example, an extrusion-forming device has been used which extrudes a clay through a die provided at one end of a drum while kneading, homogenizing and conveying the clay containing the ceramic material by the rotation of a screw in the drum (e.g., see Patent Document 1).

Figure 2:
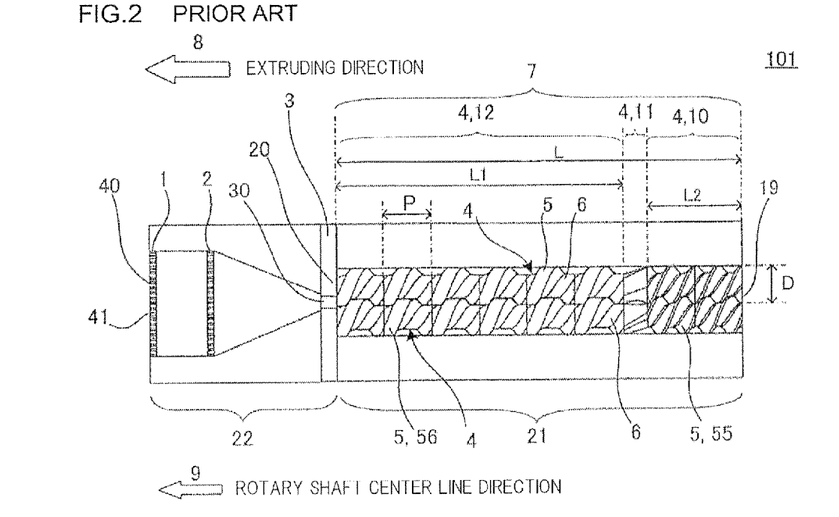
FIG. 2 is a schematic constitution diagram showing a conventional extrusion-forming device.

FIG. 2 is a schematic constitution diagram showing one example of the conventional extrusion-forming device. In a conventional extrusion-forming device 101, as shown in FIG. 2, a drum 7 has a structure in which a screw 4 is provided. When the clay flows into the drum 7 through a supply port 19, the screw 4 in the drum 7 imparts a large shear force to knead and homogenize the clay. Then, the clay kneaded and homogenized in the drum 7 is extruded from a die 1 through a screen 2, to manufacture a formed article corresponding to the shape of the die 1.

Figure 11:
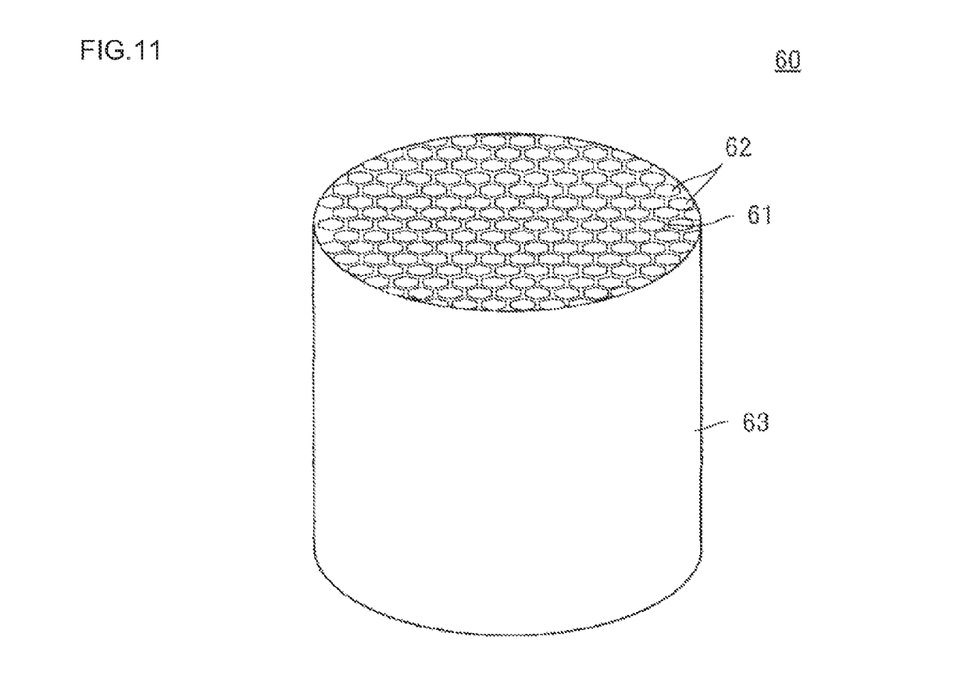
FIG. 11 is a schematic perspective view showing a honeycomb structure.

Moreover, examples of a structure obtained by firing such a formed article include a honeycomb structure 60 having a plurality of cells 62 partitioned by partition walls 61 shown in FIG. 11. Furthermore, examples of the use application of such a honeycomb structure include a catalyst carrier for deodorization, a filter for various filtering apparatuses, a catalyst carrier utilizing the catalytic function of a heat exchange unit, an internal combustion engine, a boiler, a chemical reaction apparatus, a fuel cell reformer or the like, and a filter for collecting fine particles in an exhaust gas.

Especially in recent years, the thinning of the partition walls in the above ceramic honeycomb structure has made further progress, thereby advancing the densification of honeycomb-like slits (hereinafter referred to as "forming grooves" sometimes) through which the formed article is extrusion-formed in the die provided in the extrusion-forming device. Moreover, the amount of the clay to be supplied is increased to improve productivity, and accordingly an extrusion pressure during the pressure-forwarding of the clay in the drum rises.

[Patent Document 1] JP-A-2008-137184

As described above, the thinning of the partition walls in the ceramic honeycomb structure has made further progress. When the formed article having such densified thin walls is prepared by using the above extrusion-forming device, a large resistance is applied to the clay passing through the screen or the die. At this time, with the rise of the extrusion pressure, the clay is accumulated in the drum. Moreover, pulsation occurs in the extrusion pressure or an extrusion speed, and consequently a problem occurs that the quality of the formed article is lowered. Furthermore, for example, in the honeycomb structure obtained by firing the formed honeycomb article having such a lowered formed article quality, a crack or a defect such as a strength decrease has occurred.

The present invention has been developed in view of the above conventional problems, and an object thereof is to provide an extrusion-forming device which can consequently prevent the quality of a formed article from being lowered owing to the accumulation of a clay in a drum with the rise of an extrusion pressure and owing to pulsation occurring in the extrusion pressure or an extrusion speed and which can efficiently manufacture, with a high productivity, a formed article having a honeycomb structure having a plurality of compact cells with thinner walls and to provide a method for manufacturing an extrusion-formed article by use of the device.

SUMMARY OF THE INVENTION

As a result of intensive investigation for achieving the above object, the present inventor has found that the above object is achieved by employing the following constitution and has completed the present invention. That is, the present invention is as follows.

[1] An extrusion-forming device comprising: an extruding portion having a drum including a supply port through which a clay containing a ceramic forming material flows into the inside, a screw having a rotary shaft and a spiral rotary blade disposed along the rotary shaft and configured to convey the clay in an extruding direction parallel to the rotary shaft while kneading the clay by the rotation of the rotary blade, and an extrusion port through which the clay is discharged; and a forming portion including a die through which the clay is extruded and which has forming grooves arranged in a forming face, and arranged along the extruding direction of the extruding portion, wherein the screw includes, as the screw on the side of the supply port, at least two supply port side screws having supply port side rotary blades provided so as to be rotationally symmetric with respect to the rotary shaft and, as the screw on the side of the extrusion port, at least one extrusion port side screw having an extrusion port side rotary blade, and a ratio P/D is in a range of 0.5 to 0.9, in which D is the diameter of the outermost periphery of the rotary blade, and P is the pitch of the extrusion port side rotary blade along the extruding direction.

[2] The extrusion-forming device according to [1], wherein a ratio L2/L1 between a length L2 of the supply port side screw along the extruding direction and a length L1 of the extrusion port side screw along the extruding direction is in a range of 1.33 to 2.50.

[3] The extrusion-forming device according to [1] or [2], wherein a ratio L1/L between the length L1 of the extrusion port side screw along the extruding direction and a length L of the extruding portion along the extruding direction is in a range of 0.29 to 0.43.

[4] The extrusion-forming device according to any one of [1] to [3], wherein the screws are provided along two axes in parallel in the drum.

[5] A method for manufacturing a formed article by use of the extrusion-forming device according to any one of [1] to [4], comprising: a clay supply process of introducing the clay into the drum through the supply port and rotating the screw to convey the clay in the extruding direction while kneading the clay; and a clay forming process of discharging the clay supplied in the clay supply process to the forming portion through the extrusion port while keeping a state of L3<L1, in which L3 is a clay charging length indicating a distance of a region where the clay is charged on the extrusion port side in the drum along the extruding direction, to set the extrusion pressure of the clay through the extrusion-forming face to a range of 15 to 30 MPa and to set the fluctuation of the extrusion pressure to a range of 0.1 to 1.0 MPa, thereby extrusion-forming the formed article.

[6] The method for manufacturing the formed honeycomb article according to [5], wherein the forming grooves have a honeycomb shape, and a formed honeycomb article is extrusion-formed as the formed article.

According to the extrusion-forming device having the constitutions [1] to [4], it is possible to precisely and efficiently manufacture the formed article of the clay containing the ceramic material which has a plurality of compact cells with thinner walls.

According to the formed article manufacturing method having the constitution [5], it is also possible to precisely and efficiently manufacture the formed article of the clay containing the ceramic material which has a plurality of compact cells with thinner walls.

According to the formed article manufacturing method having the constitution [6], it is also possible to precisely and efficiently manufacture the honeycomb shape formed article of the clay containing the ceramic material which has a plurality of compact cells with thinner walls.

The extrusion-forming device of the present invention and the method for manufacturing the formed article by use of the device produce an effect that it is possible to precisely and efficiently manufacture the formed article of the clay containing the ceramic material which has a plurality of compact cells with thinner walls.

DETAILED DESCRIPTION OF THE INVENTION

Hereinafter, embodiments of an extrusion-forming device and a method for manufacturing a formed article by use of the device of the present invention will be described in detail with reference to the drawings, but the present invention is not limited to the embodiments when interpreted, and various alterations, modifications and improvements can be added based on the knowledge of a person with ordinary skill without departing from the scope of the present invention.

(Extrusion-Forming Device)

Figure 1:
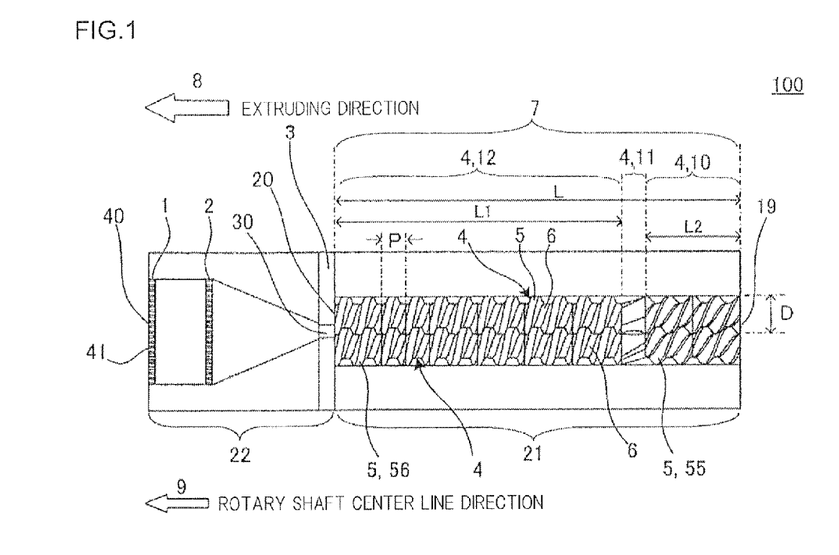
FIG. 1 is a schematic constitution diagram showing one embodiment of an extrusion-forming device of the present invention.

FIG. 1 is a schematic constitution diagram showing an extrusion-forming device 100 in one embodiment of the present invention. As shown in FIG. 1, the extrusion-forming device 100 of the present invention has a constitution including an extruding portion 21 in which a clay containing a ceramic forming material is supplied from the outside and conveyed through the inside, and a forming portion 22 which extrudes the clay discharged from the extruding portion 21 to form a formed article.

Moreover, the extruding portion 21 of the extrusion-forming device 100 in the embodiment of the present invention has a drum 7 including a supply port 19 through which the clay containing the ceramic forming material flows into the inside, a screw 4 having a rotary shaft 6 and a spiral rotary blade 5 disposed along the rotary shaft 6 and configured to convey the clay in an extruding direction 8 parallel to the rotary shaft 6 while kneading the clay by the rotation of the rotary blade 5, and an extrusion port 20 through which the clay is discharged.

Furthermore, the forming portion 22 of the extrusion-forming device 100 in the embodiment of the present invention has a die 1 through which the clay is extruded and which has forming grooves 41 arranged in a forming face 40, and is arranged along the extruding direction 8 of the extruding portion 21.

As shown in, for example, FIG. 1, the screw 4 of the extrusion-forming device 100 in the embodiment of the present invention includes, as the screw 4 on the side of the supply port 19, at least two supply port side screws 10 having supply port side rotary blades 55 provided so as to be rotationally symmetric with respect to the rotary shaft 6 and, as the screw on the side of the extrusion port, at least one extrusion port side screw having an extrusion port side rotary blade, and a ratio P/D is in a range of 0.5 to 0.9, in which D is the diameter of the outermost periphery of the rotary blade, and P is the pitch of the extrusion port side rotary blade along the extruding direction. To increase the extrusion pressure, the pitch of the screw is decreased as compared with the conventional technology. If the ratio P/D is less than 0.5, a forwarding pitch is small, and the clay cannot be conveyed. Moreover, if the ratio P/D exceeds 0.9, the extrusion pressure cannot be obtained.

In the extrusion-forming device 100 of the embodiment of the present invention, a ratio L2/L1 between a length L2 of the supply port side screw 10 along the extruding direction 8 and a length L1 of an extrusion port side screw 12 along the extruding direction 8 is preferably from 1.33 to 2.50. Furthermore, the ratio L2/L1 is further preferably from 1.80 to 2.50. A reason for this is that it is necessary to provide a region to deaerate the clay which is being conveyed or a screw to knead the clay, and hence the length L2 of the supply port side screw 10 along the extruding direction 8 needs to be from 4/7 to 5/7 of the whole screw length L. Moreover, the extrusion port side length L1 needs to be larger than a clay charging length L3 described later. In the embodiment, therefore, the length L1 is preferably as much as 12 to 18 pitches of the screw, that is, it is from 2/7 to 3/7 of the whole screw length.

In the extrusion-forming device 100 of the embodiment of the present invention, since the extrusion port side length L1 needs to be larger than the clay charging length L3 described later, a ratio L1/L between the length L1 of the extrusion port side screw 12 along the extruding direction 8 and the length L of the extruding portion 21 along the extruding direction 8 is preferably from 0.29 to 0.43.

(Extruding Portion 21)

In the extrusion-forming device of the present invention, the extruding portion 21 shown in, for example, FIG. 1 includes the drum 7 including the supply port 19 through which the clay containing the ceramic forming material flows into the inside, the screw having the rotary shaft 6 and the spiral rotary blade 5 disposed along the rotary shaft 6 and configured to convey the clay in the extruding direction parallel to the rotary shaft while kneading the clay by the rotation of the rotary blade, and the extrusion port through which the clay is discharged.

(Drum 7)

In the extrusion-forming device of the present invention, the inner length of the drum 7 shown in, for example, FIG. 1 is preferably from 189 to 357 cm. Moreover, the inner diameter of the drum 7 is preferably from 7.0 to 13.3 cm.

(Screw 4)

In the extrusion-forming device of the present invention, the screw 4 includes the supply port side screws 10 on the supply port 19 side and the extrusion port side screw 12 on the extrusion port 20 side. In the extrusion-forming device of the present invention, the whole length L of the screw 4 shown in, for example, FIG. 1 is preferably from 189 to 357 cm. A diameter D of the outermost periphery of the screw 4 is preferably from 7.0 to 13.3 cm.

(Screw 4, Rotary Blade 6)

In the extrusion-forming device of the present invention, for example, a diameter d1 of the rotary shaft 6 is preferably from 4.5 to 8.6 cm. The screw 4 may be provided along one axis, or the screws may be provided along two axes in parallel. The screws are preferably provided along two axes in parallel, because the screws are excellent in an ability of kneading the clay. The screw 4 is provided with the spiral rotary blade 5 along the rotary shaft 6. The screw includes at least two supply port side screws 10 having the supply port side rotary blades 55 provided as at least a part of the rotary blade 5 on the supply port 19 side so as to be rotationally symmetric with respect to the rotary shaft 6, and at least one extrusion port side screw 12 having an extrusion port side rotary blade 56 provided as at least a part of the rotary blade 5 on the extrusion port 20 side. Furthermore, in the extrusion-forming device of the present invention, a ratio P/D is in a range of 0.5 to 0.9, in which D is the diameter of the outermost periphery of the rotary blade 5, and P is the pitch of the extrusion port side rotary blade 56 along the extruding direction 8. In the extrusion-forming device of the present embodiment, the ratio P/D is especially preferably in a range of 0.6 to 0.7.

(Extrusion Port Side Screw 12)

Figure 3:
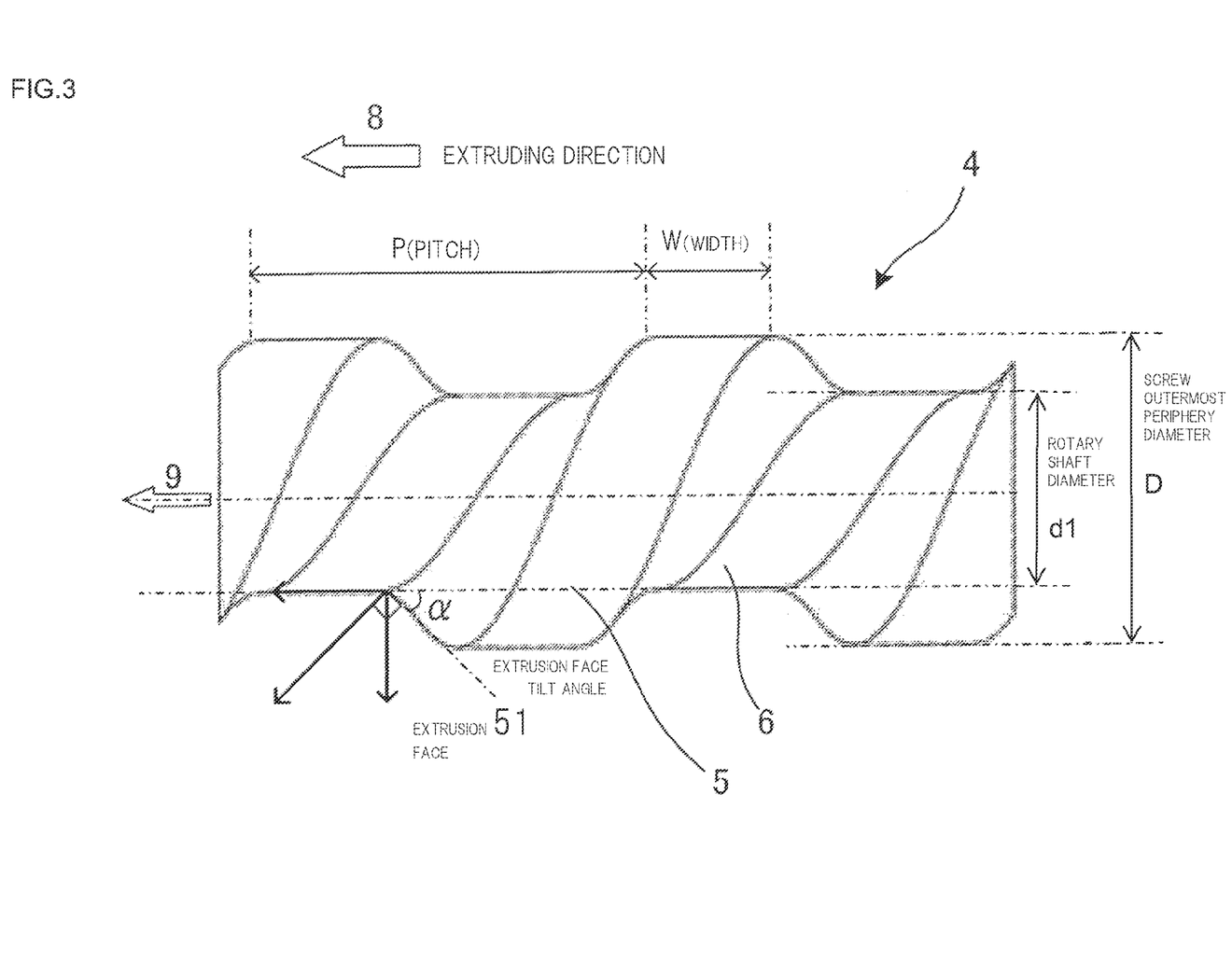
FIG. 3 is a schematic side view showing one embodiment of an extrusion port side screw of the present invention.
Figure 4:
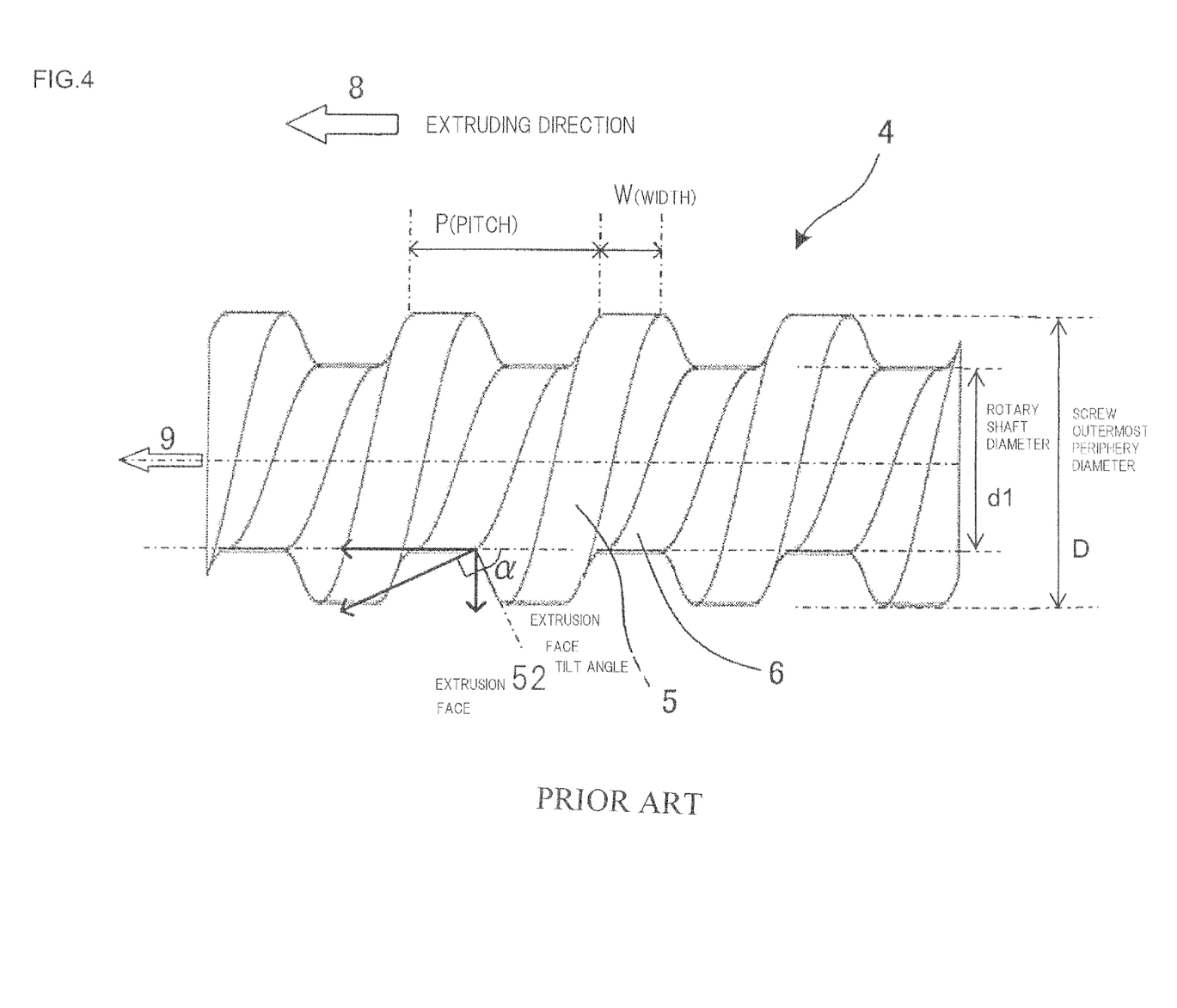
FIG. 4 is a schematic side view showing one example of a conventional extrusion port side screw.

FIG. 4 is a schematic side view showing one example of the conventional extrusion port side screw 12 (the screw 4). As shown in FIG. 4, the one extrusion port side rotary blade 56 is provided. The length L1 of the extrusion port side rotary blade 56 along the extruding direction 8 is preferably from 54 to 108 cm, and the pitch of the extrusion port side rotary blade 56 is preferably from 9.0 to 18.0 cm. FIG. 3 is a schematic side view showing one example of the extrusion port side screw 12 (the screw 4) of the present invention. As shown in FIG. 4, an extrusion face 52 of the conventional extrusion port side screw 4 has an extrusion face tilt angle α as a tilt angle with respect to the center line of the screw rotary shaft 6 in a range of 35 to 55°. In the present invention, an extrusion face tilt angle α as a tilt angle of an extrusion face 51 with respect to the center line of the screw rotary shaft 6 is in a range of 60 to 80°. The extrusion face 51 has such an acute angle along the extruding direction 8, whereby an extrusion force exerted from the extrusion face in a normal line direction (see FIG. 3 for the present invention, see FIG. 4 for the conventional technology) works strongly in the extruding direction 8, thereby producing an effect of increasing a clay conveyance force.

(Supply Port Side Screw 10)

The two supply port side rotary blades 55 are provided so as to be rotationally symmetric with respect to the rotary shaft 6. The length L2 along the extruding direction 8 is preferably from 135 to 255 cm, and the pitches of the supply port side rotary blades 55 are preferably from 9.0 to 18.0 cm.

(Conversion Screw 11)

In the extrusion-forming device of the present embodiment, a conversion screw 11 is preferably provided between the supply port side screws 10 and the extrusion port side screw 12. The conversion screw 11 performs screw shape changeover smoothly and continuously between the two supply port side screws 10 and the one extrusion port side screw 12. One or two conversion screws are preferably provided in terms of pitch number.

(Forming Portion 22, Rectification Plate 3)

In the extrusion-forming device of the present embodiment, a rectification plate 3 is preferably provided at a position where the forming portion 22 comes in contact with the drum 7. The rectification plate has a function of squeezing the clay to be extruded, thereby rectifying the clay so that the clay has a uniform flow on the downstream side from the position. The rectification plate has a slit 30 as an opening in a portion which comes in contact with the extrusion port 20, and the diameter of the opening of the slit 30 is preferably from 20 to 50 cm.

(Die): In a die used in the present embodiment, a slit width of each slit through which the clay is extruded as the formed article is preferably from 70 to 170 μm, especially preferably from 70 to 125 μm. When the slit width is in a range of 70 to 100 μm in the conventional extrusion-forming device, the clay charging length reaches the region of the supply port side screws 10 in the extruding portion in the drum, thereby causing the fluctuation or pulsation of the extrusion pressure or extrusion speed. However, in the extrusion-forming device of the present invention, the clay charging length can be kept in the region of the extrusion port side screw, whereby the fluctuation or pulsation of the extrusion pressure or extrusion speed can be suppressed. In this way, it becomes possible to correctly and efficiently manufacture a formed honeycomb article having compact cells with thinner walls which have been demanded in recent years. Moreover, in the die used in the present embodiment, a plurality of clay introduction holes are provided as introduction holes internally connected to the slits and configured to introduce the clay into the die, and the diameters thereof are preferably from 0.08 to 0.20 cm.

(Manufacturing Method of Formed Article)

In the manufacturing method of the formed article of the present invention, there is used the extrusion-forming device of the above embodiment provided with the plurality of clay introduction ports through which the clay is introduced toward the supply port side of the die and provided with the forming grooves connected to the clay introduction ports in the die. The method includes a clay supply process of introducing the clay into the drum through the supply port and rotating the screw to convey the clay in the extruding direction while kneading the clay; and a clay forming process of discharging the clay supplied in the clay supply process to the forming portion through the extrusion port while keeping a state of L3<L1, in which L3 is a clay charging length indicating a distance of a region where the clay is charged on the extrusion port side in the drum along the extruding direction, to set the extrusion pressure of the clay through the extrusion-forming face to a range of 15 to 30 MPa and to set the fluctuation of the extrusion pressure to a range of ±0.0 to 0.5 MPa, thereby extrusion-forming the formed article. It is to be noted that in the present description, as to the unit of the pressure, a conversion value is 1 Pa=$10^{-5}$ bar.

(Manufacturing Method of Formed Honeycomb Article)

Hereinafter, the method for manufacturing the formed honeycomb article by use of the extrusion-forming device of the present invention will be described. There is not any special restriction on the clay, but, for example, a clay containing 72 mass % of ceramic material, 23 mass % of water, 5 mass % of methylcellulose and another additive or the like may be used.

In the die used in the extrusion-forming device of the present invention, the slits (the forming grooves) through which the formed article of the clay is extrusion-formed have a honeycomb shape, and the formed honeycomb article is preferably extrusion-formed as the formed article.

Figure 12:
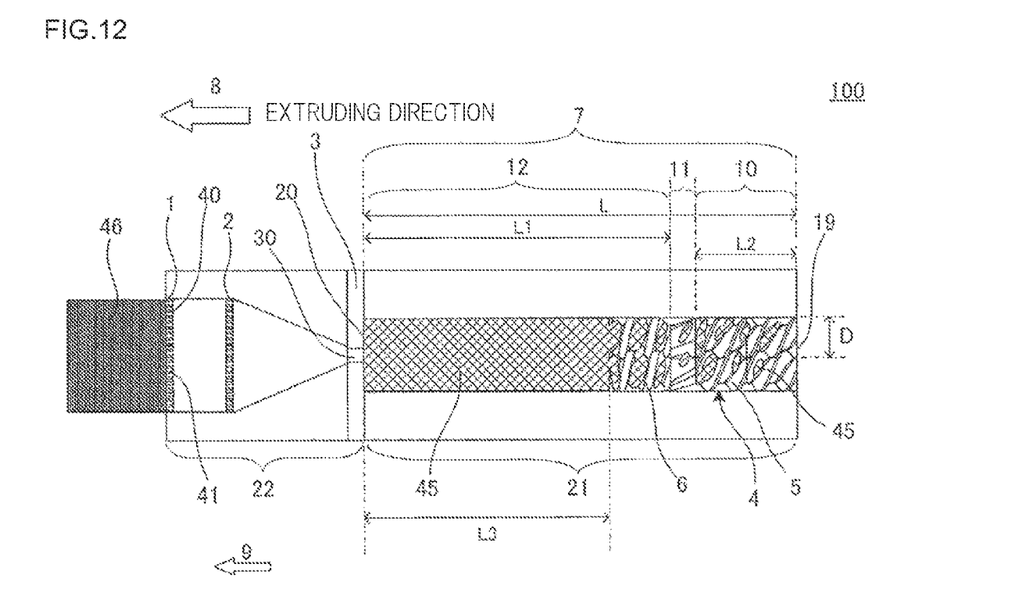
FIG. 12 is an explanatory view for explaining the clay charging length.

In the present description, the clay charging length L3 is a distance between the supply port side end of the region where the clay is charged in the extruding portion and the extrusion port 20 along the extruding direction 8 in the clay forming process. As shown in, for example, FIG. 12, the clay charging length L3 is the length of the region where the clay is charged in the drum along the extruding direction 8.

As to the clay charging length L3, the state of L3<L1 is preferably kept, because it is possible to suppress the fluctuation or pulsation of the extrusion pressure or extrusion speed which has heretofore been a cause for the forming defect of the formed article, and consequently it is possible to form the formed article having compact cells with high forming precision and production efficiency.

Figure 5:
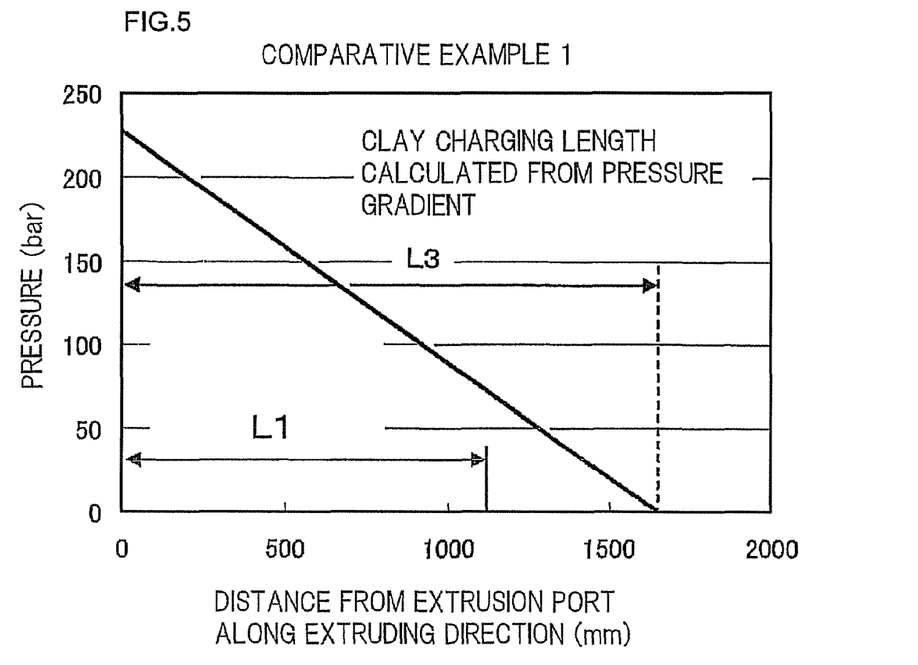
FIG. 5 is a graph showing a relation among a distance from an extrusion port in a drum of the conventional extrusion-forming device and a pressure and a clay charging length calculated from a pressure gradient.
Figure 6:
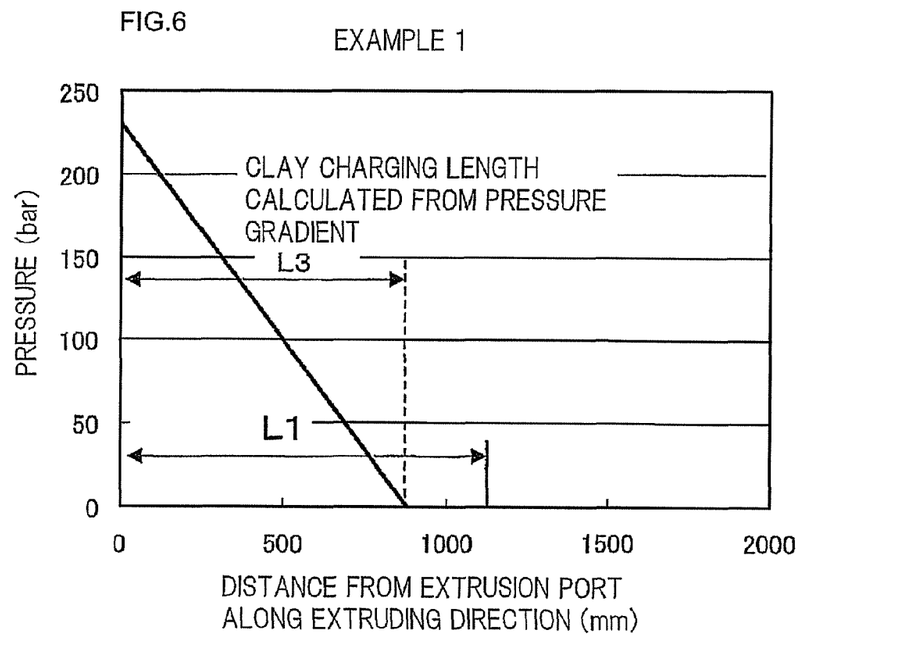
FIG. 6 is a graph showing a relation among a distance from an extrusion port in a drum of the extrusion-forming device of the present invention and the pressure and the clay charging length calculated from the pressure gradient.

The clay charging length L3 is determined by the extrusion pressure and a pressure gradient (see FIGS. 5, 6). The extrusion pressure increases, when the die slit width is small (about from 70 to 90 μm) or when the amount of the clay to be supplied is large. Therefore, even with the same pressure gradient, when the slit width is small and the amount of the clay to be supplied is large, the extrusion pressure increases, and the clay charging length L3 increases, whereby the state becomes L3>L1 sometimes. Moreover, the pressure gradient is determined by a ratio of the supply amount/the screw rotation speed. Even with the same extrusion pressure, when the screw rotation number decreases, the pressure gradient becomes moderate, and the clay charging length L3 increases. In consideration of these situations, conditions for satisfying L3<L1 are shown in Table 1. A ratio L3/L1 between the clay charging length L3 and the length L1 is preferably from 0.5 to 1.0.

TABLE 1

| Screw outermost periphery diameter (cm) | 13.3 |
|---|---|
| Supply amount (kg/hr) | 300 to 1000 |
| Screw rotation speed (rpm) | 10 to 35 |
| Die slit width (μm) | 70 or more |
| Supply amount/screw rotation speed | 25 to 35 |
| Die opening diameter (cm) | 13 |

The extrusion pressure is the pressure of the clay measured at the extrusion port in the clay forming process. In the method for manufacturing the formed article by use of the extrusion-forming device of the present invention, the extrusion pressure is preferably in a range of 150 to 300 bar (15 to 30 MPa), and the fluctuation thereof is in a range of preferably ±0.0 to 0.5 MPa, especially preferably ±0.0 to 0.3 MPa.

The extrusion speed is a discharge amount cm/s of the formed honeycomb article at the extrusion port per second. In the method for forming the formed article by use of the extrusion-forming device of the present invention, the extrusion speed is preferably from 1.0 to 6.0 cm/s and the fluctuation thereof is in a range of ±0.2 cm/s.

The forming time is a time elapsed after the clay is supplied to the extrusion-forming device and the formed article starts to be extrusion-formed through the die.

(Fluctuation of Pressure with Respect to Forming Time)

As a method for measuring the fluctuation of the pressure with respect to the forming time, the following method was used. For example, in the drum 7 of FIG. 1, general-purpose pressure sensors are attached, with an equal space therebetween in the direction of a rotary shaft center line 9, to an attachment hole extending through the inner wall of the drum 7 and exposed between biaxial screws in a direction vertical to the rotary shaft center line 9 of the screw 4. In the measurement method, the pressure sensors are connected to a recording meter (a data logger), and the numeric values of the pressure sensors are recorded in real time.

(Fluctuation of Speed with Respect to Forming Time)

As a method for measuring the fluctuation of the speed with respect to the forming time, the following method was used. A speed sensor is provided in a direction vertical to the extruding direction 8 of the formed article, the speed sensor is connected to the recording meter in the same manner as described above, and the numeric value of the speed sensor is recorded in real time.

In the extrusion-forming device of the present invention, as to a structure other than the screws, the conventional structure of the extrusion-forming device can basically be employed as it is. In the extrusion-forming device of the present invention, two screws in the drum may rotate in the same direction or different directions. Moreover, the number of the screws may be one or two.

There is not any special restriction on the shape of the formed article by the extrusion-forming device of the present invention as long as the shape can be obtained by extrusion forming. However, the present invention is suitable for the forming of, for example, the formed honeycomb article in which the partition walls to partition the cells are thin and are easily deformed.

[EXAMPLES]

Example 1

In Example 1, Comparative Example 1, extrusion-forming devices were used, respectively. Each of the devices had conditions of D, P and W shown in Table 1, and included screws 4 disposed along two axes in parallel and including two supply port side screws 10 having the supply port side rotary blades 55, one extrusion port side screw 12 having the extrusion port side rotary blade 56 and a conversion screw 11 sandwiched between the supply port side screws 10 and the extrusion port side screw 12 and configured to continuously convert a screw shape from the two screws into the one screw. The supply port side screws 10 having the same conditions were used in Comparative Example 1 and Example 1. A side view of an extrusion-forming device 100 of Example 1 is shown in FIG. 1. Furthermore, FIG. 3 is a partially enlarged side view of the screw 4 (the extrusion port side screw 12). Part dimensions are shown in Table 2.

Comparative Example 1

A side view of an extrusion-forming device 101 of Comparative Example 1 is shown in FIG. 2. Furthermore, FIG. 4 is a partially enlarged side view of a screw 4 (an extrusion port side screw 12). Part dimensions are shown in Table 2.

Example 1, Comparative Example 1

As shown in FIGS. 1, 2, the screws 4 of Example 1 or Comparative Example 1 were arranged along two axes in parallel in an extruding portion 21 in the internal space of a drum 7 having the same shape. Furthermore, in the drum 7, from an extrusion port 20 side, the extrusion port side screw 12, the conversion screw 11 and the supply port side screws 10 were arranged in order as the screw 4. Before the extrusion port 20, a forming portion 22 provided with a die 40 was arranged. Part dimensions are shown in Table 2.

Moreover, at this time, the fluctuation of the extrusion pressure was ±8.5 bar, and the fluctuation of the extrusion speed was ±5.6 mm/s.

Figure 9:
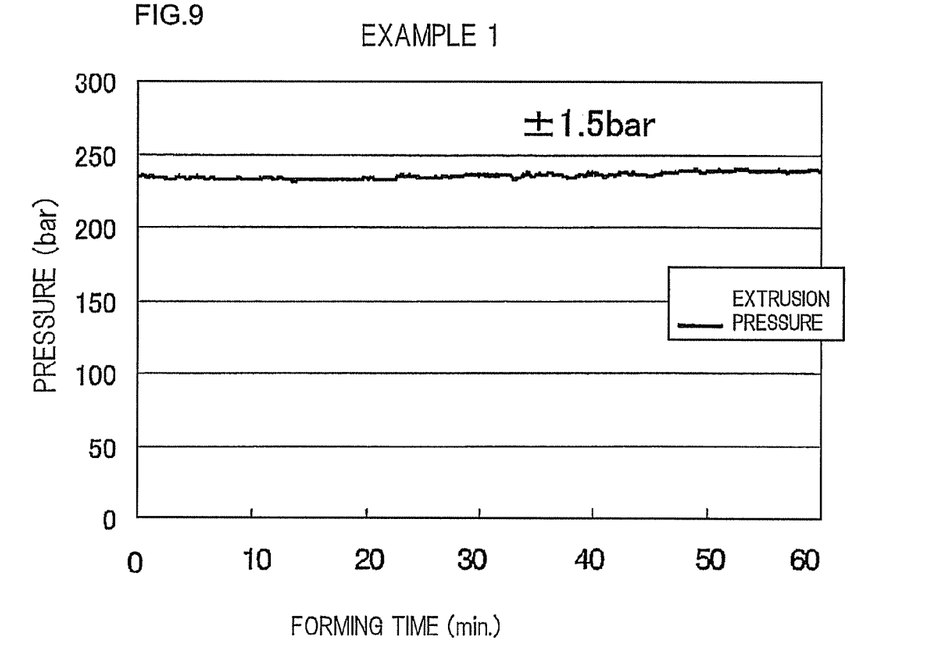
FIG. 9 is a graph showing a relation between the forming time of the extrusion-forming device of the present invention and the pressure.
Figure 10:
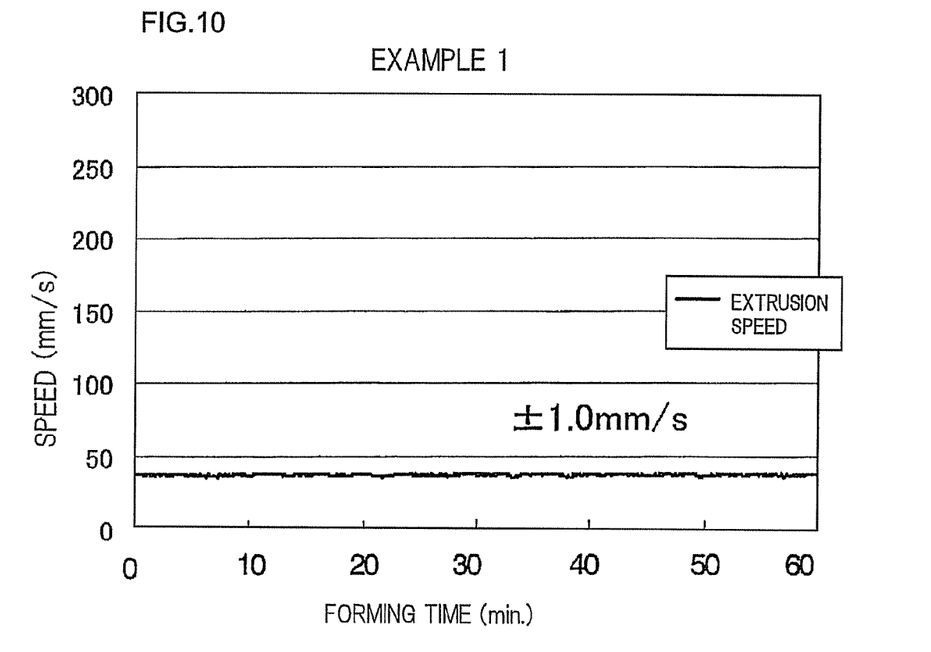
FIG. 10 is a graph showing a relation between the forming time of the extrusion-forming device of the present invention and the extrusion speed.

As shown in FIGS. 9, 10, in Example 1, the pulsation which occurred in Comparative Example 1 was suppressed. At this time, the fluctuation of the extrusion pressure was ±1.5 bar, and the fluctuation of the extrusion speed was ±1.0 mm/s. When the formed honeycomb article manufactured in this manner was fired, it was possible to obtain a honeycomb structure which did not have any defect.

The extrusion-forming device of the present invention can preferably be applied to the manufacturing of the formed article of the clay containing the ceramic material, especially the formed article having a ceramic honeycomb structure, and

TABLE 2

| | Screw element constituting conditions | Screw outermost periphery diameter D (mm) | Screw pitch P (mm) | P/D | Vertex width of rotary blade W (mm) | Pitch number Number of pitches | Length along rotary shaft direction Extrusion port side screw length: L1 (mm) | Length along rotary shaft direction Supply port side screw length: L2 (mm) | Extrusion face tilt angle α |
|---|---|---|---|---|---|---|---|---|---|
| Comparative Example 1 | Extrusion port side screw (rotary blade: 1 screw) | 70 | 90 | 1.29 | 27.5 | 6 | 540 | — | 55 |
| | | 92 | 120 | 1.3 | 36.8 | 6 | 720 | — | 55 |
| | | 133 | 180 | 1.35 | 55.4 | 6 | 1080 | — | 54 |
| | Supply port side screw (rotary blades: 2 screws) | 70 | 90 | 1.29 | 5 | 15 | — | 1350 | — |
| | | 92 | 120 | 1.3 | 6.8 | 15 | — | 1800 | — |
| | | 133 | 180 | 1.35 | 10.4 | 13 | — | 2340 | — |
| Example 1 | Extrusion port side screw (rotary blade: 1 screw) | 70 | 45 | 0.64 | 13.8 | 12 | 540 | — | 70 |
| | | 92 | 60 | 0.65 | 18.4 | 12 | 720 | — | 70 |
| | | 133 | 90 | 0.68 | 27.7 | 12 | 1080 | — | 70 |
| | Supply port side screw (rotary blades: 2 screws) | 70 | 90 | 1.29 | 5 | 15 | — | 1350 | — |
| | | 92 | 120 | 1.3 | 6.8 | 15 | — | 1800 | — |
| | | 133 | 180 | 1.35 | 10.4 | 13 | — | 2340 | — |

As to a die, there was used a die including honeycomb-like forming groove having a forming groove (slit) width of 75 μm in a forming face thereof, and a plurality of introduction holes provided on the face thereof opposite to the forming face and connected to the forming grooves in the die. The die having the same conditions was provided at the tip of the forming portion, in the extruding direction 8, of the extrusion-forming device of each of Comparative Example 1 and Example 1, and the extrusion-forming of the clay containing the ceramic forming material was performed. The other operating conditions of the extrusion-forming device at this time are shown in Table 3.

TABLE 3

| | |
|---|---|
| Screw outermost periphery diameter (cm) | 13.3 |
| Supply amount (kg/hr) | 600 |
| Screw rotation speed (rpm) | 20 |
| Die slit width (μm) | 75 |
| Die opening diameter (cm) | 13 |

Moreover, graphs of the extrusion pressure at the extrusion port 20 of the extrusion-forming device 100 of Example 1 and the extrusion speed of the clay with respect to the forming time are shown in FIGS. 9 and 10, respectively. Furthermore, graphs of the extrusion pressure at the extrusion port 20 of the extrusion-forming device 101 of Comparative Example 1 and the extrusion speed of the clay with respect to the forming time are shown in FIGS. 7 and 8, respectively.

Figure 7:
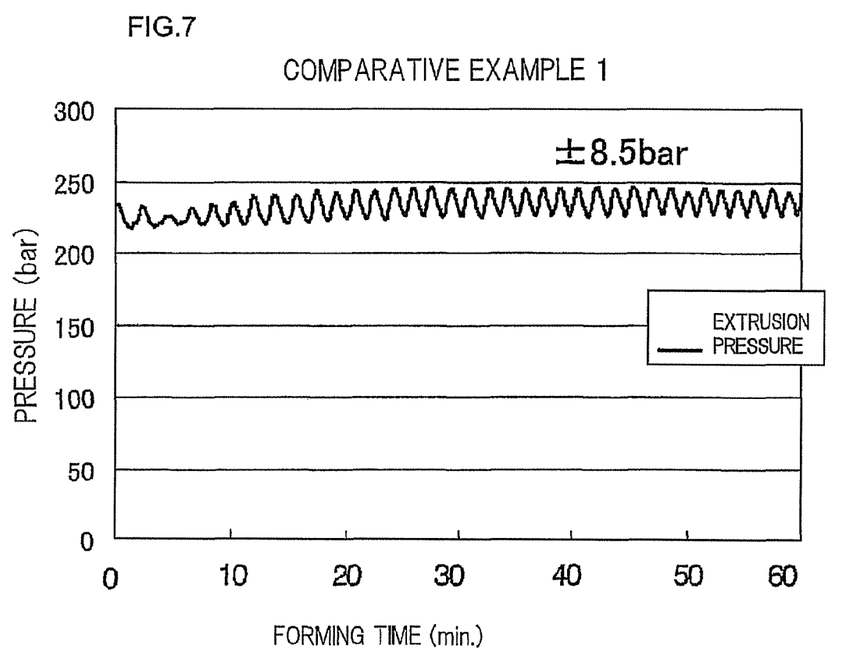
FIG. 7 is a graph showing a relation between a forming time of the conventional extrusion-forming device and the pressure.
Figure 8:
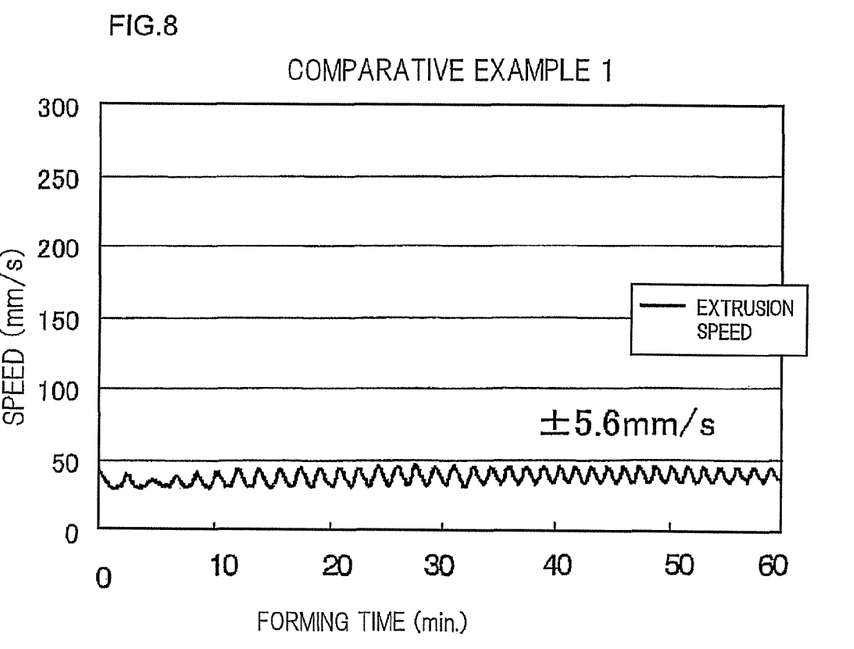
FIG. 8 is a graph showing a relation between the forming time of the conventional extrusion-forming device and an extrusion speed.

As shown in FIGS. 7, 8, in Comparative Example 1, the extrusion pressure and the extrusion speed cause pulsation.

has a high industrial use possibility. Moreover, it is possible to manufacture the formed article having the honeycomb structure having a plurality of compact cells with thinner walls with a good efficiency and a high productivity, and the present invention has a remarkably high industrial use possibility.

[Description Of Reference Numerals]

1: die, 2: screen, 3: rectification plate, 4: screw, 5: rotary blade, 6: rotary shaft, 7: drum, 8: extruding direction, 9: rotary shaft center line direction, 10: supply port side screw, 11: conversion screw, 12: extrusion port side screw, 19: supply port, 20: extrusion port, 21: extruding portion, 22: forming portion, 30: opening, 40: forming face: 41: forming groove (slit), 45: region where clay is charged, 51: rotary blade extrusion face, 52: rotary blade extrusion face, 55: supply port side rotary blade, 56: extrusion port side rotary blade, 60: honeycomb structure, 61: partition wall, 62: cell, 63: outer wall, 100: extrusion-forming device, and 101: extrusion-forming device.

What is claimed is:

1. An extrusion-forming device comprising:
   an extruding portion having a drum including a supply port through which a clay containing a ceramic forming material flows into the inside, a screw having a rotary shaft and a spiral rotary blade disposed along the rotary shaft and configured to convey the clay in an extruding direction parallel to the rotary shaft while kneading the clay by the rotation of the rotary blade, and an extrusion port through which the clay is discharged; and a forming portion including a die through which the clay is extruded and which has forming grooves arranged in a forming face, and arranged along the extruding direction of the extruding portion, wherein the screw includes, as the screw on the side of the supply port, at least two supply port side screws having supply port side rotary blades provided so as to be rotationally symmetric with respect to the rotary shaft and, as the screw on the side of the extrusion port, at least one extrusion port side screw having an extrusion port side rotary blade, a ratio P/D is in a range of 0.6 to 0.7, in which D is the diameter of the outermost periphery of the rotary blade, and P is the pitch of the extrusion port side rotary blade along the extruding direction, an extrusion face tilt angle of the at least one extrusion port side screw with respect to a center line of the screw rotary shaft is 60 to 80°, and the at least one extrusion port side screw has a constant extrusion face tilt angle along a length of the at least one extrusion port side screw.

2. The extrusion-forming device according to claim 1, wherein a ratio L2/L1 between a length L2 of the supply port side screw along the extruding direction and a length L1 of the extrusion port side screw along the extruding direction is in a range of 1.33 to 2.50.

3. The extrusion-forming device according to claim 1, wherein a ratio L1/L between the length L1 of the extrusion port side screw along the extruding direction and a length L of the extruding portion along the extruding direction is in a range of 0.29 to 0.43.

4. The extrusion-forming device according to claim 1, wherein the screws are provided along two axes in parallel in the drum.

5. The extrusion-forming device according to claim 2, wherein a ratio L1/L between the length L1 of the extrusion port side screw along the extruding direction and a length L of the extruding portion along the extruding direction is in a range of 0.29 to 0.43.

6. The extrusion-forming device according to claim 2, wherein the screws are provided along two axes in parallel in the drum.

7. The extrusion-forming device according to claim 3, wherein the screws are provided along two axes in parallel in the drum.

8. The extrusion-forming device according to claim 5, wherein the screws are provided along two axes in parallel in the drum.

9. The extrusion-forming device according to claim 1, wherein the length of the screw on the side of the supply port is at least 4/7 and not more than 5/7 a length L of the extruding portion along the extruding direction of the extrusion-forming device.

10. The extrusion-forming device of claim 1, wherein a width of each of the forming grooves is from 70 to 125 µm, a diameter D of an outermost periphery of the rotary blade is form 7.0 to 13.3 cm, and a length L of the extruding portion along the extruding direction is form 189 to 357 cm.

11. The extrusion-forming device of claim 1, wherein the p/d ratio is in a range of 0.64 to 0.68.

* * * * *